United States Patent [19]
Forestier

[11] Patent Number: 5,590,151
[45] Date of Patent: Dec. 31, 1996

[54] PROCESS FOR MELTING SCRAP IRON IN AN ELECTRIC FURNACE AND INSTALLATION FOR IMPLEMENTING THE PROCESS

[75] Inventor: Guy Forestier, Saint-Just-Saint-Rambert, France

[73] Assignee: Clecim, Cergy-Pontoise, France

[21] Appl. No.: 374,514

[22] PCT Filed: May 5, 1994

[86] PCT No.: PCT/FR94/00523

§ 371 Date: Jun. 12, 1995

§ 102(e) Date: Jun. 12, 1995

[87] PCT Pub. No.: WO94/26938

PCT Pub. Date: Nov. 24, 1994

[30] Foreign Application Priority Data

May 13, 1993 [FR] France ................... 93 05785

[51] Int. Cl.[6] .................................................. F27D 1/00
[52] U.S. Cl. ........................... 373/72; 373/80; 373/108
[58] Field of Search .......................... 373/71, 72, 79, 373/80, 108

[56] References Cited

U.S. PATENT DOCUMENTS

| | | | |
|---|---|---|---|
| 4,821,284 | 4/1989 | Janiak et al. | 373/108 |
| 4,853,941 | 8/1989 | Rappinger et al. | 373/72 |
| 4,856,021 | 8/1989 | Janiak et al. | 373/108 |
| 4,887,277 | 12/1989 | Finkl | 373/71 |
| 5,264,020 | 11/1993 | Ehle et al. | 75/10.38 |
| 5,410,564 | 4/1995 | Takashiba et al. | 373/102 |

FOREIGN PATENT DOCUMENTS

| | | |
|---|---|---|
| 0255793 | 2/1988 | European Pat. Off. . |
| 0258101 | 3/1988 | European Pat. Off. . |
| 9118120 | 11/1991 | WIPO . |
| 9210594 | 6/1992 | WIPO . |

*Primary Examiner*—Tu Hoang
*Attorney, Agent, or Firm*—Pollock, Vande Sande & Priddy

[57] ABSTRACT

A direct current electric furnace for melting ferrous raw material, such a scrap iron, comprising a vessel (1) closed by a detachable cover (13), at least one consumable electrode (5) which passes through at least one opening (16) in the cover (13), at least one stationary electrode (5) positioned in the bottom (2) of the vessel (1), and comprising at least one source of direct current, the vessel being defined by a bottom (2) in the shape of a basin (21) and by a lateral wall (12). The height (H1) and the cross-section (S1) of the basin (21) are determined by the conditions of use, such that the basin (1) (21) can contain a prescribed quantity of molten metal, the height (H2) of the lateral wall (12) of the vessel (1) being such that the vessel (1) can accommodate a sufficient charge of scrap iron (7) to produce, in a single melting operation, the prescribed quantity of a molten metal.

7 Claims, 1 Drawing Sheet

PROCESS FOR MELTING SCRAP IRON IN AN ELECTRIC FURNACE AND INSTALLATION FOR IMPLEMENTING THE PROCESS

FIELD OF THE INVENTION

The invention relates to an electric arc furnace for the production of molten metal, in particular liquid steel.

THE BACKGROUND OF THE INVENTION

Electric arc furnaces have been used for a long time and to an increasing extent for the production of steel by melting scrap iron or any other ferrous raw material, for example a pre-reduced ore.

Generally, an electric arc furnace comprises a melting vessel which is closed, in its upper region, by a dome-shaped detachable cover and is connected to one or more electrodes which are linked to a current source.

The melting pot comprises a bottom, in the form of a basin, which is lined with refractory material, and a cooled substantially cylindrical lateral wall, the bottom part of which is connected to the upper edge of the basin.

Each electrode is attached to the end of an arm which extends, in an overhanging manner, above the vessel and penetrates into the vessel vertically, passing through an opening in the cover provided for that purpose.

In order to carry out a casting operation, the furnace is opened by moving aside the cover and the electrodes, generally by rotation about a vertical axis. The raw scrap iron is charged into the furnace by means of conveying skips or "baskets" which are taken hold of and transported above the furnace by a charging crane which travels above the entire installation, each basket being provided with a drop bottom for the discharge of the scrap iron into the furnace.

Thus, a certain quantity of scrap iron, referred to as "the charge", is introduced into the vessel by means of one or more baskets.

The furnace is then again closed and the electrodes are lowered into the furnace. Electric current is applied and the electric arcs formed between the electrodes and the scrap iron bring about the melting of the scrap ion.

The molten metal is collected in the basin and forms a bath covered by a layer of dross. The furnace is generally mounted to tip on rounded-off supports, and the metal is cast by pouring or passage through a pour hole provided in the bottom of the basin and closed by a stopper rod or an external nozzle.

All these operations bring about considerable wear of the hearth of refractory material lining the basin, the state of which is examined after each casting operation, the refractor lining being repaired or replaced periodically.

The scrap iron may be charged cold into the furnace, but this causes an excessive consumption of electrical energy in bringing the charge from the ambient temperature to the melting temperature.

For this reason, it is generally preferred to use a less costly source of energy to heat the scrap iron before it is charges into the furnace.

In particular, since the melting of the scrap iron produces within the furnace, a considerable volume of very hot fumes attempts are generally made to recover the calorific power of the fumes to heat the scrap iron prior to its introduction into the furnace.

PRIOR ART

Various means have been conceived to this end.

For example, the furnace may be connected to a sealed chamber provided in the fume-evacuation system and one or more baskets awaiting charging are placed in position in said chamber. The chamber is then provided with a gateway of considerable dimensions which must be opened each time a fresh basket is introduced or withdrawn. These operations reduce the productivity and, in addition, cause a considerable volume of fumes to escape into the workplace each time the gateway is opened.

In order to save time and to reduce the risks of pollution, it has been proposed to use a mobile preheating chamber which is provided with a drop bottom and which can thus, itself, form a charging unit which is displaced between a preheating position at the side of the furnace, in which the chamber is connected into a fume-evacuation system, and a furnace-charging position above the furnace.

Applicants' EP0514.526, for the name of the same Company, for example, describes an installation of this type in a manner so as to simplify the gas-circulating system and to reduce the possibilities of pollution.

However, in that installation the dome of the furnace must be opened in order to charge the heated scrap iron, and it is not possible to prevent a substantial emission of fumes, nor the splashing of steel and dross when the vessel is not empty at the time the scrap iron is tipped in.

Since the quantity of liquid metal which must be produced in the furnace prior to each casting operation usually necessitates the melting of a plurality of charges which are introduced in succession into the furnace, the vessel must be opened fairly frequently, a factor which increases the possibilities of pollution.

Indeed, the dimensions of an electric furnace are generally determined as a function of the desired overall production and the available electric power. In other respects, each casting is associated with various operations and generally necessitates a rocking of the furnace and, consequently, the stopping thereof. In order to increase productivity, it is therefore of interest to reduce the number of casting operations during a given workday.

On the other hand, the steel produced in the furnace is used, downstream of the furnace, in installations, in particular in continuous casting installations, the capacities of which have increased and which involve the casting of a large quantity of metal in a single operation.

Accordingly, attempts have been made to increase the capacity of electrical furnaces which, currently, are designed to produce 100 to 150 tons of steel at each casting.

The general dimensions of the vessel do not normally permit the introduction, in a single charge of the quantity of scrap iron required for a casting of 120 or more tons, owing to the very great difference in density between the raw scrap iron and the liquid metal.

In known installations of this type, the casting operation is carried out in the following manner.

A first charge of scrap iron is first heated and then introduced into the furnace, the dome of which was opened. The dome is then closed and the electrodes are introduced in order to proceed with the melting. During this time, a second charge of scrap iron is preheated by the fumes coming from the furnace.

After melting of the first charge, the dome of the furnace is again opened and the preheated second charge is introduced into the vessel above the first bath of metal. The dome is then again closed, and melting of the second charge takes place.

The molten metal is collected in the basin and is added to that corresponding to the first charge. The number of charges required for one casting operation is thus melted in succession.

These steps of handling the scrap iron and the opening of the dome of the furnace are the causes of the losses of time and of heat and, consequently, reduce the throughput of the installation. In addition, as indicated above, possibilities of pollution result from the escape of the fumes.

In order to overcome this drawback, it has been proposed that a certain quantity of scrap iron be stockpiled in a chamber of fairly large dimensions which opens directly into the vessel and through which the fumes pass, the thus preheated scrap iron being introduced gradually into the furnace, without opening the furnace.

Applicants' FR-A-2.498.309, for example, describes an arc furnace which opens towards the rear on to a chamber which forms a fume-evacuation hood and in which is dumped a large quantity of scrap iron which may periodically be pushed into the metal bath.

WO91/18120, on the other hand, describes an installation comprising two furnaces each having a cover to which is attached a side chamber opening on to the side of the furnace, via a lateral opening, ad forming a flue in which is stockpiled a certain quantity of scrap iron which is introduced through the upper part of the flue and progressively descends into the metal bath, after having been heated by contact with the fumes which escape via the flue.

Arrangements of this kind, complicate the design and use of the furnace. More over, despite the use of a stockpiling chamber of large dimensions, it is still necessary to open the chamber periodically in order to introduce a fresh quantity of scrap iron commensurately with the melting of the scrap iron, and the possibility that fumes will escape cannot be ruled out entirely.

SUMMARY OF THE INVENTION

The object of the invention is an arc furnace which makes it possible to overcome all the aforementioned drawbacks.

The invention relates to a in a general manner, to a direct current electric furnace for the melting of a ferrous raw material, such as scrap iron, comprising a vessel having an upper region closed by a detachable cover for the introduction of a charge of material to be melted, at least one consumable electrode which is positioned substantially in the axis of the vessel and is mounted to slide vertically so as to descend into the interior of the vessel, passing through at least one opening in the cover, at least one stationary electrode in the bottom of the vessel, and comprising at least one source of direct current having poles connected, respectively, to the consumable electrode and the stationary electrode, vessel comprising a bottom covered by a bed plate of refractory material and forming a basin having a raised edge and a depth and a maximum cross-section, and a lateral wall positioned substantially in the extension of the edge of the basin and defining a cylindrical space having a cross-section which is substantially equal to the maximum cross-section of the basin.

According to the invention, the depth and the cross-section of the basin having been determined in terms of metallurgical considerations, such that the basin can contain a prescribed quantity of molten metal, the lateral wall of the vessel extends to a height such that, taking into consideration the differences in density between the scrap iron and the molten metal, it is possible for the cylindrical space defined by the lateral wall to contain a sufficient charge of scrap iron to produce, in a single melting operation, the prescribed quantity of molten metal.

The invention is linked to recent developments in the art relating to direct current furnaces and, in particular, the increasing of their production capacity.

It is known that the characteristics of a melting furnace are determined, essentially, according to the desired overall production and the available electric power.

Previously, it appeared necessary to use, for high-capacity electric furnaces, an alternating current supply, thus usually using three consumable graphite electrodes. For some time now, however, as a result of various improvements applicants have ben able, to use direct current even for substantial productions, for example 100 to 150 tons per casting, this supply means having numerous advantages.

In particular, even though, in a furnace with alternating current, the electrodes between which the arcs are produced are subjected to more or less random mechanical and magnetic stresses, a higher degree of control of the magnetic effects is possible in a furnace with direct current. It is, in particular, the arrangements described in applicants' French patent 2.602,320 or 2.602.351, which permit control of the direction of the electric arcs, by the judicious orientation of the return conductors.

In addition, with direct current, it is possible, even at very high intensities, to use a single electrode of large cross-section, which is more resistant and, moreover, attracted transversely to a lesser degree by the scrap iron, due to the fact that it descends progressively in the axis of the charge. Accordingly, it has been observed that it is possible to have a much greater length of penetration of the electrode into the vessel without significant danger of rupture, it being possible for the ratio between the free length of the electrode relative to its diameter to go up to a factor of ten. It is thus possible for the vessel to have a sufficient height, such that the volume of scrap iron which is introduced in a single charge can furnish the quantity of metal necessary for a casting, even in the case of heavy-duty production.

As a result, it is no longer necessary to open the dome of the furnace between two casting operations, since the furnace is charged in a single operation. Losses of heat are thus prevented and pollution is reduced.

In practice, the height of the lateral wall is such that the volume defined by it is between six and twelve times the capacity of the basin which corresponds to the prescribed quantity of molten metal.

The thermal output is also improved, due to the fact that the scrap iron charge remains longer in the interior of the furnace in contact with the fumes which escape via the opening in the dome.

On the other hand, according to a further significant characteristic of the invention, the vessel of the furnace is provided with additional heating means, which permit preheating of the charge to be carried out within the vessel. As a result, it is possible for the charge to be introduced in a cold state into the furnace. This reduces the possibility that pollutants may escape.

In a first embodiment, the production of a metal casting is carried out in two stages in the following manner:

The charge of scrap iron corresponding to a casting is introduced into the vessel and, after closure of the cover, the charge is subjected to preheating by applying heat in the vessel in a first stage of the process during which the furnace is separated from the source of current, the consumable electrode being raised above the cover and the introduction opening being closed by a cover. Then, in a second stage of the process, the melting of the preheated scrap iron is carried out by the gradual introduction of the electrode into the vessel, the furnace being connected to the source of electric current.

The supply of the heat which is required for preheating is, preferably, provided by additional heating means arranged about the periphery of the vessel, for example one or more burners distributed about the circumference of the vessel and opening up at the bottom of the lateral wall.

It is, however, also possible to provide, immediately above the junction of the lateral wall and the bottom, at least one pipe for the injection of hot gas, which pipe is connected, for example, to a combustion chamber which is provided with a burner.

It should be noted, that it is possible for the additional heating means arranged about the periphery of the vessel to function during the electric-arc melting operation.

It is for this reason that, in a further embodiment, the first preheating stage may be omitted, current being applied as soon as the dome is closed after charging. The consumable electrode gradually descends into the vessel, penetrating into the charge of scrap iron, the central region of which is melted commensurately with the progress of the electrode, while the annular region of the charge, which is disposed along the lateral wall, is heated by the hot gases which are produced by the burners arranged at the bottom of the lateral wall and which rise along the wall and escape through the outlet opening provided in the cover.

BRIEF DESCRIPTION OF THE DRAWINGS

The invention will be better understood from the detailed description of several embodiments which are given by way of example and are illustrated in the attached drawings.

DETAILED DESCRIPTION

Figure 1:
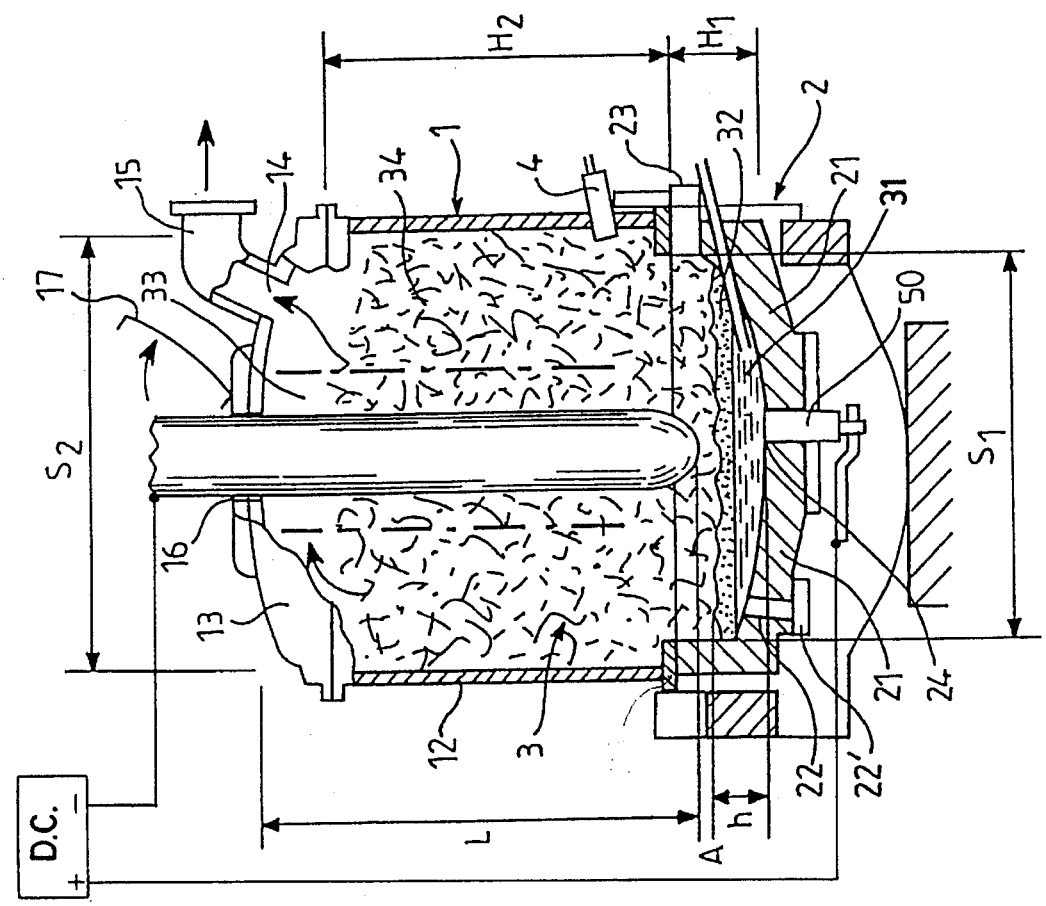
FIG. 1 shows a diagrammatic longitudinal section of an electric furnace according to the invention.

FIG. 1 shows an elevation of an electrical-furnace according to the invention.

A conventional electric melting furnace of this kind generally comprises a vessel 1 having a bottom 2 which is lined with refractory material and forms a hearth 21 in the form of a basin and is defined by a lateral wall 12 whose upper region is closed, by a detachable cover 12.

The furnace is, advantageously, a rocking furnace, the bottom 2 being mounted in a support 10 which rests on a stationary base via rounded-off support members. The furnace is provided with the usual devices for the casting of molten metal and dross, for example, two pouring spouts on either side of the rocking axis perpendicular relative to the plane of FIG. 1, which in particular, it is possible for the furnace to be provided with two pouring spouts on either side of the rocking axis perpendicularly relative to the plane of the Figure, which permit the casting of the steel and the removal of the dross by causing the furnace to tip toward the front or toward the rear, respectively.

It is also possible, as shown in the drawings to use a steel pour hole which passes through the bottom of the basin 21 and is closed by a nozzle 22', the furnace being provided, on the opposite side, with a cleaning opening 23 through which the dross can be removed.

In this case, the basin 21 may be encircled by a substantially vertical wall of refractory material, which permits the accumulation of a large quantity of molten metal without an excessive increase in the diameter of the basin 21.

As indicated above, the furnace is supplied with direct current and is preferably associated with a single consumable electrode 5, forming a cathode, which can descend vertically into the vessel, and with one or more stationary electrodes 50, forming the anode, which are positioned in the hearth 21. The electrodes 5, 50 are connected by conductors 54 to two terminals, negative and positive respectively, of a source of direct current.

In a manner known per se, and not illustrated in the drawings, the electrode 5 is supported, in a sliding manner, by an external support member, such as a pivoting arm which also supports the supply conductor, and it is introduced vertically into the furnace, passing through an opening 16 in the cover 13.

When the electrode 5 is withdrawn, the opening 16 may be closed, tightly closed by a detachable closure member 17.

In addition, the cover 13 is provided with at least one opening 14 which is extended by a pipe 15 which may be connected, in a detachable manner, to a system for the removal and treatment of the gas and fumes produced in the furnace.

The electrode 5 descends gradually, commensurately with the melting of the scrap iron 3, and the molten metal forms a liquid bath 31 which is collected in the basin 21. For obvious reasons the bath 31 is covered by a layer of dross 32.

The liquid metal may collect in the basin 21 up to a level A which, in the example illustrated, is disposed slightly below the cleaning opening 23, taking into account the thickness of the layer of dross 32 which covers the bath.

When the basin 21 is filled with metal up to level A, the liquid metal is poured via the nozzle 22, by opening the closing device 22 which may be of the sliding-valve type.

As has been indicated above, the productive capacity of the installation and, in particular, the number of castings which can be carried out each working day, depend on the power of the furnace and on its dimensions, although these cannot be selected freely.

The production of steel, at each casting, is a function of the capacity of the basin 21 in which the metal accumulates, and thus depends on the shape of the basin, its cross-section S1, and the height h of the maximum level A above the lowest point of the basin. However as noted, these dimensions depend on the conditions of use.

Generally, the client specifies the desired overall production, the liquid steel required by the installation arranged downstream of the furnace, for example a continuous casting installation, the electric power available and the number of castings to be carried out in a work day.

On the basis of these specifications, the quantity of metal which is to be produced at each casting and, consequently, the capacity of the basin 21 in which the metal is to collect, are calculated.

In order to select the dimensions of the basin which will permit this capacity to be obtained, it is also necessary to take certain parameters into consideration. It is, for example, generally necessary to comply with a certain relationship between the depth of the bath and the diameter of the basin. The depth must, in particular, be sufficient to permit the mixing of the metal and, if required, the injection of gas or the intake of various products via nozzles, for example in order to bring about refining after the melting.

On the other hand, the metal bath is usually covered by a layer of dross and it is not possible to increase significantly the surface of steel in contact with the dross and, accordingly, the cross-section of the upper region of the basin.

Finally, the furnace is placed in position on a bed and is surrounded by numerous supplementary fittings. It is therefore necessary to restrict the spatial requirements of the furnace as much as possible. Accordingly, the cross-section S1 of the basin, the shape thereof, the maximum depth h of the bath and the total height of the bottom 2 are determined.

As indicated above, the lateral wall of the vessel is provided with a cross-section S2 which is substantially equal to the maximum cross-section S1 of the basin, the latter cross-section thus having been defined as a function of the various metallurgical and use-related requirements.

Taking into consideration the height Hi of the upper edge of the basin from its bottom 24, it is possible to determine the height H2 of the lateral wall 12, such that the overall volume of scrap iron which can be introduced into the vessel 1 is at least six times the liquid metal capacity of the basin 21.

This relationship of the volumes depends on the shape of the basin 21. In practice, the height of the free volume above the bath, up to the level of the cover 13, will be at least four times the maximum height h of the metal in the basin.

It is, however, not possible to increase, to a substantial extent, the free length L of the electrode 5 which penetrates into the interior of the vessel from the insertion opening 16.

In order for this free length to have sufficient strength, the ratio of its length L to the diameter d of the electrode may go up to a factor of ten.

In a general manner, it is possible, by using a single electrode which descends in the axis of the vessel, producing a central pit in the charge of scrap iron, to eliminate the possibilities of rupturing, since the electrode is attracted relatively symmetrically. In that case, the ratio of the scrap iron volume to the volume of liquid metal may go up to twelve, but preferably remains between eight and ten.

As shown in the drawings, the furnace according to the invention is distinguished, essentially, from conventional furnaces by the considerable height of the lateral wall 12 which rises above the bottom 2 and, consequently, the very substantial volume of scrap iron 3 which may be introduced into the vessel in a single charge.

According to a further important characteristic of the invention, the furnace is provided with self-contained heat-supplying means, such as a burner 4, opening into the lower region of the lateral wall 12, slightly above the upper edge 25 of the bottom 2.

It is advantageous to use a plurality of burners 4 distributed about the periphery of the wall 12.

Each burner 4 is connected to means which supply a fuel, such as gas, gas oil or coal, and to means which supply a combustive agent, such as air or oxygen, the relative amounts being adjusted in order to control the stoichiometric ratio of the flame.

In addition, it is advantageous for the vessel to be substantially tightly sealed during the melting operation. To this end, instead of the customary use of a cleaning opening which has large dimensions and is closed by means of a simple door, it is preferable to reduce the opening to dimensions which are just adequate for the removal of the dross and to seal it in a substantially tight manner. As indicated in applicants WO Applications No. 92.10594 in the name of the same, it is thus possible for a pressure equilibrium to be provided more readily, preventing air from entering, to improve the energy balance of the furnace.

As a result of all these arrangements, it is possible to provide for the preheating of the scrap iron within the interior of the furnace, even if a single furnace is used.

As indicated above, it did heretofore appear advisable to recover the heat of the fumes by causing fumes to pass into a chamber provided adjacent to the furnace or even by using two furnaces which operate alternately, for the preheating and the melting operations, with recycling of the fumes from one furnace to the other.

By contrast, due to the invention, since the furnace contains all the scrap iron which is necessary for one casting and since it is, in addition, provided with burners, it is possible to carry out the preheating and the melting operations in two successive steps.

After charging the required quantity of scrap iron 3, the dome 13 is closed, the piping 15 is connected up with the evacuation and treatment system and the burner 4 is supplied.

Figure 2:
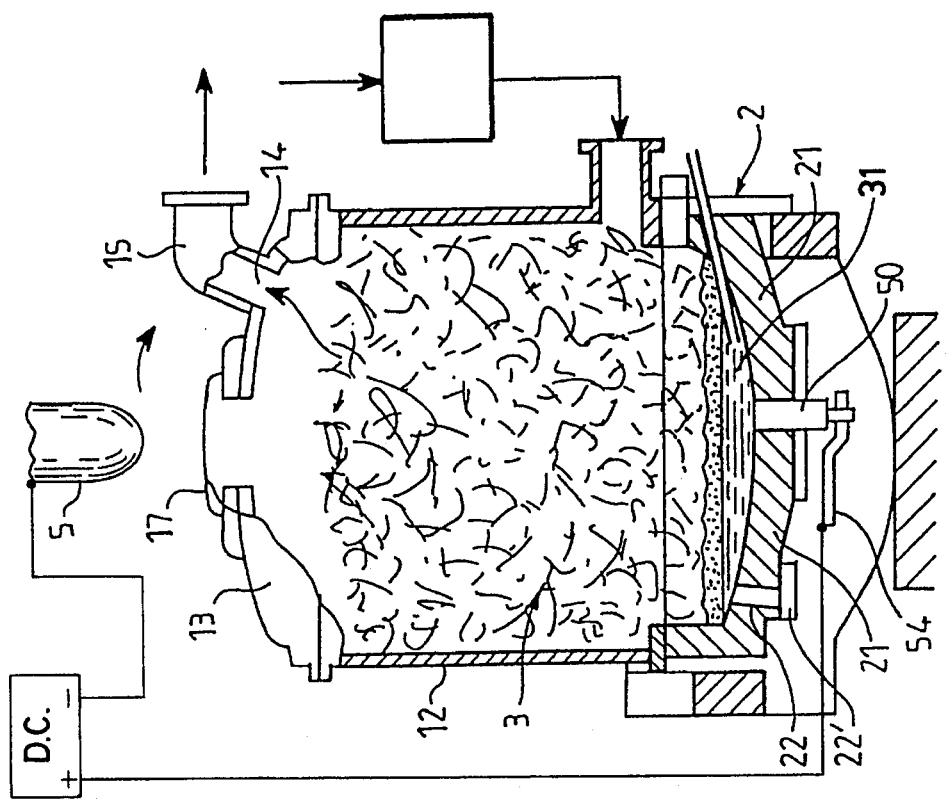
FIG. 2 shows a diagrammatic longitudinal section of a modified embodiment.

In this first preheating step, the electrode 5 is held in position above the dome 13 and the insertion opening 16 is closed by the shutter 17, as shown in FIG. 2.

The scrap iron 3, which fills the furnace 1 to a fairly high level, is thus heated by the burners 4 and the hot fumes which rise through the charge to escape via the piping 15, together with the gaseous compounds given off by the scrap iron.

Due to the use of a self-contained heating means within the interior of the furnace itself, the gaseous compounds, which are frequently poisonous, are diluted solely in the fumes produced by the burners 4, and the amount of gas evacuated via the piping 15 is, thus, considerably reduced and may be treated in units which are specifically adapted to the nature of poisonous compounds.

Once the scrap iron 3 has been brought to a sufficiently high temperature, preheating is stopped and the second step of melting follows.

The shutter 17 is opened in order for the electrode 5 to descend into the vessel. Since the opening 16 has a relatively reduced cross-section, in comparison to that of the dome, the quantity of gas which may escape at that moment is minimal, especially since the electrode 5 is immediately introduced into the opening. The possibilities of pollution are thus considerably reduced and, in addition, it is possible to prevent any cooling which, of necessity, results in conventional arrangements when the preheated scrap iron is transported and discharged into the furnace.

As soon as the consumable electrode 5 is in contact with the scrap iron, it is connected up with the source of electricity and with the stationary electrode 50, and the contact is established via the intermediary of the scrap iron 3 and, possibly, a pool of liquid metal 31 which is left in the bottom of the basin. Electric arcs are formed between the electrode and the scrap iron which encircles the electrode and gradually melts while forming a pit which permits the electrode 5 to descend progressively, as shown in FIG. 1.

The charge of scrap iron 3 thus comprises a central region 33 in the immediate vicinity of the electrode 5, in which region the scrap iron is brought to a very high temperature by the electric arcs, and an annular region 34 which extends along the lateral wall 12. The heat which is produced in the central region 33 is transmitted by conduction and radiation to the annular region 34 which is also heated by convection, due to the circulation of fumes which escape via the piping 15.

Furthermore, it is possible and advantageous to actuate the burners 4 in order to further raise the temperature of the gas which rises in the annular region 34.

Due to the particularly substantial height of the charge of scrap iron, the greater part of which is thus heated during the descent of the electrode 5, an increase is brought about in the temperature of the scrap iron above the bath and descending into the bath commensurately with the melting.

The above process may be compared to that which is applied in furnaces comprising a lateral storage chamber, as described above, but, according to the invention, it is carried out on the total charge required for one casting, which charge is introduced into the furnace in a single step.

The entire melting operation is thus carried out under particularly economical conditions.

To save time, it is possible to omit the preheating step by causing the electrode 5 to descend on to the cold charge as soon as the furnace is closed. In that case, in fact, the electric power is used for melting the central region 33 surrounding the electrode 5, and the preheating of the lateral region 34, which constitutes the preponderant part of the charge, is brought about by the burners and the fumes from melting which escape via the piping 15.

The invention may also be applied to other types of electric furnaces and, in particular, to existing furnaces, the lateral region of which can simply be modified to accommodate the structure of the invention.

It is also possible to use other self-contained heat-supplying means for the preheating operation, for example, electric resistance means.

I claim:

1. Direct current electric furnace for melting a ferrous raw material and producing a predetermined, quantity of molten metal at each casting, said furnace comprising:
   (a) a vessel having an axis and comprising a bottom constituting a hearth lined with refractory material and having a form of a basin with a raised upper edge, and a cooled substantially cylindrical lateral wall having a bottom connecting to said upper edge of said basin and an upper part which is closed by a detachable cover for introducing a charge of raw material to be melted;
   (b) at least one consumable electrode which is mounted to slide substantially along said axis of said vessel so as to descend vertically into an interior of said vessel by passing through at least one opening provided in said cover and provided with a removable shutter;
   (c) at least one stationary electrode positioned in said hearth;
   (d) at least one source of direct current having two poles connected, respectively, to said at least one consumable and stationary electrodes, said at least one consumable electrode gradually descending in said vessel for melting said raw material and forming a bath of molten metal which collects in said basin, said bath being covered by a layer of dross;
   (e) said basin having a first opening for pouring said molten metal and a second opening for removing said dross, said basin having a height and a maximum cross-section defining a capacity corresponding to said predetermined quantity of molten metal;
   (f) wherein said lateral wall has a cross-section which is substantially equal to said maximum cross-section of said basin and a height which is so selected that a volume defined by said lateral wall is between six and twelve times said capacity of said basin for allowing said vessel to contain a charge of raw material sufficient to produce, in a single melting operation, said predetermined quantity of molten metal.

2. Direct current electric furnace for melting a ferrous raw material and producing a predetermined quantity of molten metal at each casting, said furnace comprising:
   (a) a vessel having an axis and comprising a bottom constituting a hearth lined with refractory material and having a form of a basin with a raised upper edge, and a cooled substantially cylindrical lateral wall having a bottom connecting to said upper edge of said basin and an upper part which is closed by a detachable cover for introducing a charge of raw material to be melted;
   (b) at least one consumable electrode which is mounted to slide substantially along said axis of said vessel so as to descend vertically into an interior of said vessel by passing through at least one opening provided in said cover and provided with a removable shutter;
   (c) at least one stationary electrode positioned in said hearth;
   (d) at least one source of direct current having two poles connected, respectively, to said at least one consumable and stationary electrodes, said at least one consumable electrode gradually descending in said vessel for melting said raw material and forming a bath of molten metal which collects in said basin up to a level, said bath being covered by a layer of dross;
   (e) said basin having a first opening for pouring said molten metal and a second opening for removing said dross, said basin having a height and a maximum cross-section defining a capacity corresponding to said predetermined quantity of molten metal;
   (f) wherein said lateral wall has a cross-section which is substantially equal to said maximum cross-section of said basin and a height which is so selected that a volume defined by said lateral wall is between six and twelve times said capacity of said basin for allowing said vessel to contain a charge of raw material sufficient to produce, in a single melting operation, said predetermined quantity of molten metal;
   (g) said vessel being associated with additional heating means for introducing hot gases at said bottom of said lateral wall, said hot gases rising at least through an annular region of a charge of said raw material along said lateral wall and escaping through an outlet opening in said cover.

3. Electric furnace according to claim 1 or 2, wherein said at least one consumable electrode is a single consumable electrode which penetrates into said furnace with a length starting from said cover, a ratio of said length to a diameter of said consumable electrode being no greater than 10.

4. Electric furnace according to claim 1, wherein said vessel is provided with additional heating means for preheating of a charge within said vessel.

5. Electric furnace according to claim 4, wherein said additional heating means comprise at least one burner which opens into the interior of said vessel at said bottom of said lateral wall.

6. Electric furnace according to claim 4 or 5, wherein said additional heating means comprise at least one pipe for injection of hot gas, said at least one pipe debouching into the interior of said vessel immediately above the junction of said lateral wall and said bottom.

7. Electric furnace according to claim 6, wherein said pipe is connected to a combustion chamber which is provided with a burner and supplied with fuel gas.

\* \* \* \* \*